(12) United States Patent
Spieth et al.

(10) Patent No.: US 11,582,836 B2
(45) Date of Patent: Feb. 14, 2023

(54) BACKLIGHT WINDOW DEFROSTING SYSTEM BASED ON FIELD OF VIEW

(71) Applicant: Ford Global Technologies, LLC, Dearborn, MI (US)

(72) Inventors: Mary Caye Catherine Spieth, Ann Arbor, MI (US); Mukesh Kumar, Canton, MI (US); Lawrence C. Karas, New Boston, MI (US); David Stewart, Grosse Pointe Park, MI (US); Andrew Phillips, Plymouth, MI (US); Ajay Pal, Canton, MI (US); Yang Yang, NoVi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 595 days.

(21) Appl. No.: 16/578,579

(22) Filed: Sep. 23, 2019

(65) Prior Publication Data
US 2021/0092802 A1    Mar. 25, 2021

(51) Int. Cl.
*H05B 3/84* (2006.01)
*B60S 1/02* (2006.01)
*H05B 1/02* (2006.01)

(52) U.S. Cl.
CPC ............... *H05B 3/84* (2013.01); *B60S 1/026* (2013.01); *H05B 1/0236* (2013.01); *H05B 2203/035* (2013.01)

(58) Field of Classification Search
CPC .......... H05B 3/84; H05B 3/86; H05B 1/0236; H05B 2203/035; H05B 2203/007; H05B 2203/031; H05B 2214/02; B60S 1/026; B60S 1/586
See application file for complete search history.

(56) References Cited

U.S. PATENT DOCUMENTS

| | | | |
|---|---|---|---|
| 3,982,092 A | 9/1976 | Marriott | |
| 4,864,100 A | 9/1989 | Cicak | |
| 6,521,868 B1 * | 2/2003 | Kyrtsos | H05B 3/84 219/202 |
| 9,045,043 B2 * | 6/2015 | Hoke | B60H 1/00864 |
| 2003/0106883 A1 * | 6/2003 | Sangwan | H05B 3/84 219/203 |
| 2007/0120756 A1 * | 5/2007 | Ogino | H01Q 1/1271 343/704 |

FOREIGN PATENT DOCUMENTS

| | | | | |
|---|---|---|---|---|
| CA | 2871208 C | * | 8/2019 | ......... B60H 1/00428 |
| WO | WO-2010043659 A1 | * | 4/2010 | ............. G07C 5/008 |

* cited by examiner

*Primary Examiner* — Shawntina T Fuqua
(74) *Attorney, Agent, or Firm* — Vichit Chea; Price Heneveld LLP

(57) ABSTRACT

An apparatus for heating a window of a vehicle comprises an electrical storage unit configured to store an electrical charge and a plurality of heating circuits disposed on a window of the vehicle. The apparatus further comprises a controller configured to monitor the electrical charge of the electrical storage unit and selectively activate one or more of the heating circuits based on the electrical charge.

16 Claims, 6 Drawing Sheets

BACKLIGHT WINDOW DEFROSTING SYSTEM BASED ON FIELD OF VIEW

FIELD OF THE INVENTION

The present invention generally relates to a method and an apparatus for heating a portion of a vehicle and, more particularly, to a method and an apparatus for heating or defrosting a window of a vehicle.

BACKGROUND OF THE INVENTION

Modern automotive vehicles include a number of convenience features that may promote ease of use and efficiency in operation. Traditionally, automotive vehicles have relied on internal combustion engines to drive the vehicle and supply energy to various vehicle systems and accessories. However, vehicles are increasingly relying on electrical storage cells to power the drivetrain and other systems. The disclosure relates to a defrosting or heating system for a backlight of a vehicle that may provide for various benefits, particularly for electric or hybrid vehicles that rely on power from batteries or electrical storage cells to sustain operation.

SUMMARY OF THE INVENTION

According to one aspect of the present invention, an apparatus for heating a window of a vehicle is disclosed. The apparatus comprises an electrical storage unit configured to store an electrical charge and a plurality of heating circuits disposed on a window of the vehicle. The apparatus further comprises a controller configured to monitor the electrical charge of the electrical storage unit and selectively activate one or more of the heating circuits based on the electrical charge.

The invention can also include any one or a combination of the following features:
  the electrical storage unit is configured to power a drivetrain of the vehicle;
  the plurality of heating circuits comprise at least: a first circuit disposed over a first zone of the window; and a second circuit disposed over a second zone of the window;
  the first zone is disposed over a central portion of the window and the second portion is disposed over a second zone around a perimeter of the first zone;
  the first zone forms a triangular shape comprising a base extending substantially parallel to a base of the window;
  the window is a backlight of the vehicle and the first zone is aligned with a vision cone defining a field of view reflected from a rearview mirror of the vehicle;
  the vision cone is defined by a height range of operators of the vehicle and the first zone extends to a perimeter of the vision cone reflected through the backlight;
  the selective activation of the heating circuits comprises: in response to the electrical charge being greater than a first threshold charge, activating the first circuit and the second circuit;
  the selective activation of the heating circuits comprises: in response to the electrical charge being less than the first threshold charge, activating the first circuit and suppressing the activation of the second circuit;
  the heating circuits further comprise a third circuit, wherein the third circuit is disposed over a third portion disposed around the perimeter of the first zone;
  the first zone forms a triangular shape comprising a base, wherein the second portion is disposed below the base and the third portion is disposed above the base;
  the selective activation of the heating circuits comprises: in response to the electrical charge being less than the first threshold charge, activating the first circuit, the second circuit, and the third circuit; and in response to the electrical charge being less than a second threshold charge, suppressing the activation of the second circuit and the third circuit;
  a user interface, wherein the controller is configured to identify a state of the user interface and selectively suppress an activation of at least one of the heating circuits based on the state;
  the user interface comprises a movable switch comprising a plurality of positions identifying the state;
  the user interface comprises a selection menu accessible via a human-machine interface (HMI) comprising a display screen;
  the human-machine interface (HMI) is disposed in a center stack of a passenger compartment of the vehicle; and/or
  in response to the state indicated by the user interface, the controller is configured to prioritize the suppression of the heating circuits based on the state over the electrical charge of the an electrical storage unit.

According to another aspect of the present invention, a method for controlling a multi-zone backlight heating module of a vehicle is disclosed. The method comprises supplying operating energy to one of more motors of the vehicle via an electrical storage unit of the vehicle and monitoring an electrical charge of the electrical storage unit. The method further comprises selectively supplying current from the electrical storage unit to a plurality of heating circuits forming the multi-zone backlight heating module. Selectively supplying the current comprises, in response to the electrical charge being greater than a first threshold charge, activating each of the plurality of heating circuits, and, in response to the electrical charge being less than the first threshold charge, suppressing current to a first heating circuit of the plurality of heating circuits. The method can also include selectively supplying the current in response to the electrical charge being less than a second threshold charge, suppressing current to the first heating circuit and a second heating circuit, and supplying current to a third heating circuit configured to heat a central portion of the backlight.

According to another aspect of the present invention, an apparatus for heating a backlight of a vehicle is disclosed. The apparatus comprises an electrical storage unit configured to store an electrical charge wherein the electrical storage unit is configured to power a drivetrain of the vehicle and a plurality of heating circuits disposed on a window of the vehicle. The heating circuits comprise a first circuit configured to heat a central zone of the backlight, wherein the central zone forms a triangular shape comprising a base extending substantially horizontal along the backlight and a perimeter and a second circuit configured to heat a secondary zone disposed outside the perimeter of the central zone. The apparatus further comprises a controller configured to monitor the electrical charge of the electrical storage unit and selectively activate the first circuit and the second circuit in response to the electrical charge greater than a threshold charge. The controller is further configured to suppress current to the second circuit in response to the electrical charge less than the threshold charge.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
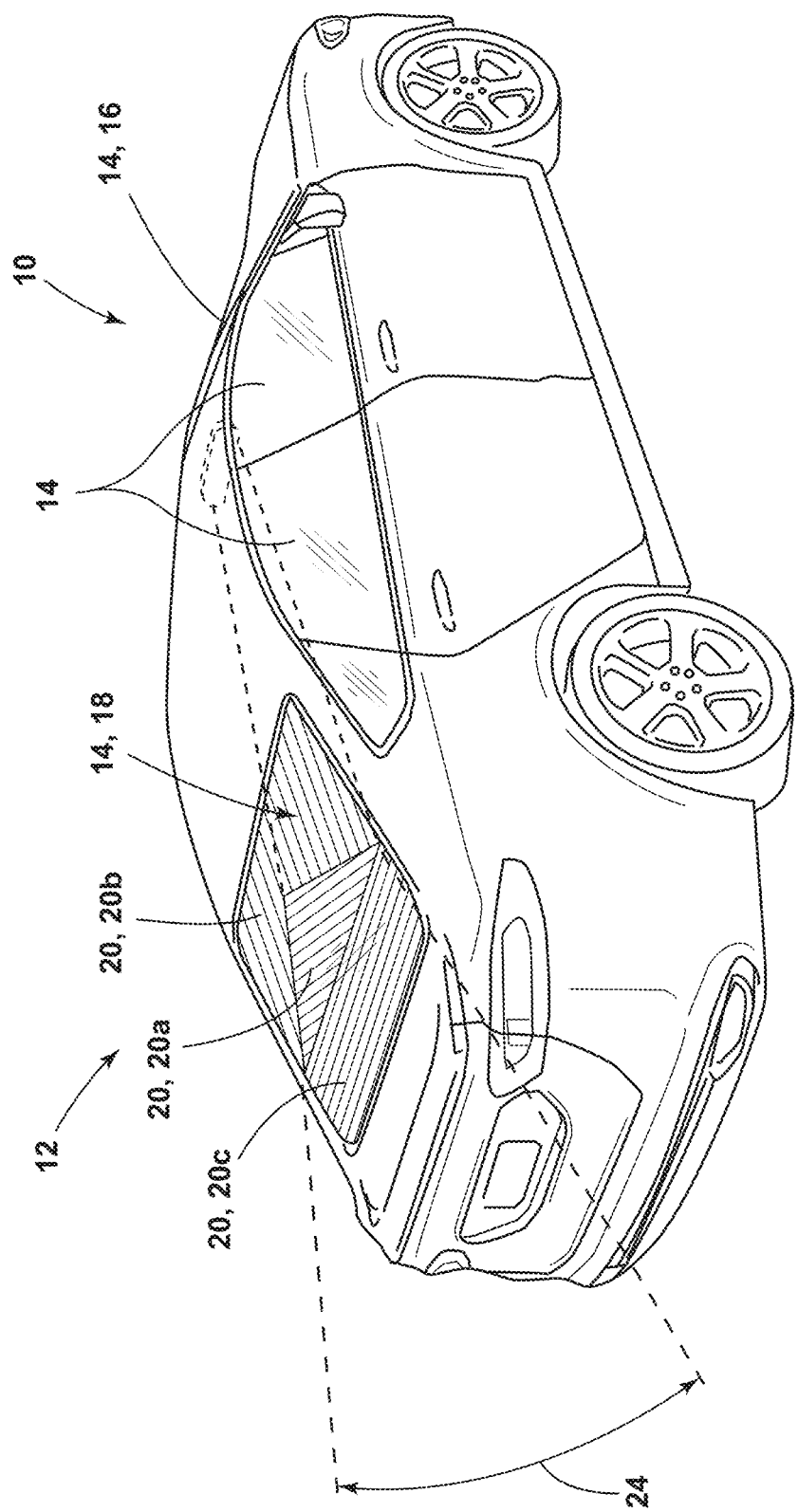
FIG. 1 is a projected view of a vehicle comprising a multi-zone backlight heating system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Figure 2:
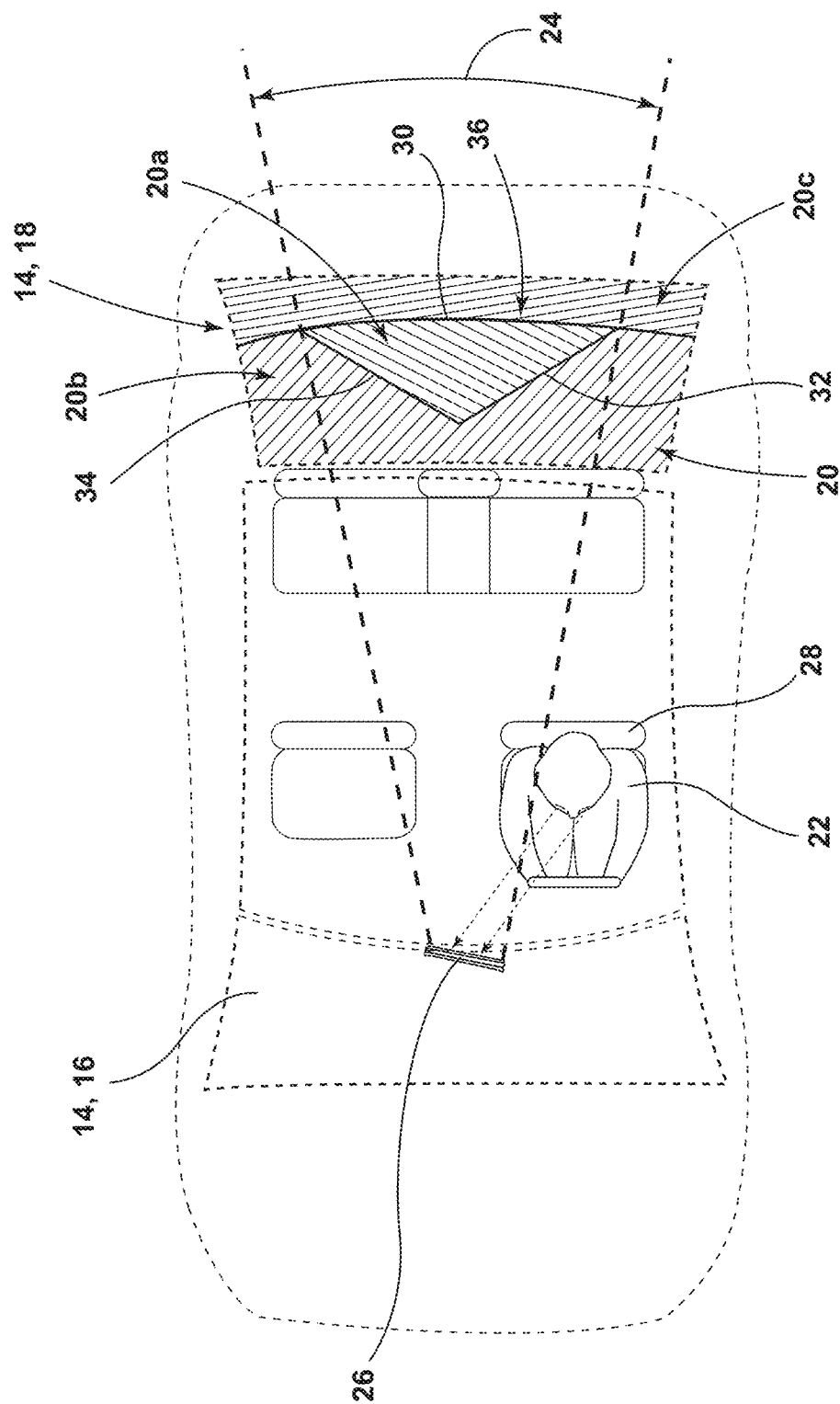
FIG. 2 is a top plan view of a vehicle comprising a multi-zone backlight heating system.

Referring to FIGS. 1 and 2, a vehicle 10 is shown comprising a multi-zone heating system 12. In general, the system 12 may be implemented on various windows 14 of the vehicle 10, and, as demonstrated in the exemplary implementation, the system 12 may be implemented on the window in the form of a windshield 16 and/or a backlight 18 of the vehicle 10. The multi-zone heating system 12 may comprise a plurality of heating zones 20. The heating zones may comprise a first heating zone 20a, a second heating zone 20b, and/or a third heating zone 20c. As discussed later, a controller of the system 12 may be configured to selectively activate each of the heating zones 20a-20c to efficiently heat a window 14 of the vehicle 10 without drawing unnecessary current from a power supply or electrical storage unit of the vehicle 10.

Each of the heating zones 20a-20c of the system 12 may be arranged on the window 14 based on a prioritization of the portions of the backlight 18 that may be most beneficial to an operator 22 of the vehicle 10. For example, the first heating zone 20a may correspond to a primary heating zone that may include or substantially encompass a field of view 24 of the operator 22 reflected from a rearview mirror 26. For example, the first heating zone 20a may include a cone-shape or triangular zone that is configured to include a vision cone of the operator 22. The vision cone and corresponding shape of the first heating zone 20a may be based on the expected height of the operator 22 and the corresponding seating position of an operator's seat 28 in the vehicle 10 relative to the rearview mirror 26 and the backlight 18. Accordingly, the first heating zone 20a of the multi-zone heating system 12 may be positioned such that the field of view 24 of the operator 22 may be heated independently of the remaining portions of the backlight 18 (e.g., second heating zone 20b, third heating zone 20c).

Each of the second heating zone 20b and the third heating zone 20c may be disposed on the window 14 or backlight 18 around a perimeter of the first heating zone 20a. In this configuration, the first heating zone 20a may be disposed over a central portion of the backlight 18, whereas the second heating zone 20b and the third heating zone 20c may extend from the perimeter of the first heating zone 20a to an outside perimeter of the window 14 or backlight 18. As demonstrated in the exemplary implementation, the second heating zone 20b may be positioned on the backlight 18 above a base 30 of the triangular shape, which may extend substantially horizontal across a width of the backlight 18. The third heating zone 20c may be disposed over a portion of the backlight 18 extending below the base 30. In this configuration, the second heating zone 20b may be prioritized for heating after the first heating zone 20a and before the third heating zone 20c based on the distribution of each of the heating zones 20a-20c over the surface of the backlight 18.

For the purposes of describing and defining the invention, it is noted that the terms "substantially" and "approximately" are utilized herein to represent the inherent degree of uncertainty that may be attributed to any quantitative comparison, value, measurement, or other representation. For example, the substantially horizontal description of the base 30 denotes the length may include a curvature that diverges from the horizontal path but still results in a horizontal leg extending from a driver's side to a passenger's side of the vehicle 10. Similarly, the terms "substantially" and "approximately" may be utilized to describe variations in the shape, proportion, or position of each of the zones 20a-20c. For example, the first zone 20a may vary in position over a range of 10-20% of the proportions of the window 14 while still covering a substantially central portion of the window 14. Additionally, the legs and intersections forming the triangular shape may be substantially triangular while including curved lines and rounded intersections that may vary in degree to suit a surface profile of the windows 14, stylistic variations, and/or to accommodate variations in manufacturing processes. Accordingly, the terms "substantially" and "approximately" as discussed herein provide for variations from specific rigid shapes and structures while still defining clear metes and bounds that may easily be understood by those having ordinary skill in the art.

Each of the heating zones 20a-20c may correspond to resistive conductors or heating elements disposed on or within one or more layers of transparent material (e.g., glass, polymer, etc.) utilized to form the backlight 18. Each of the heating zones 20a-20c may be controlled by a controller 42 of the system 12 via a corresponding heating circuit 60. The controller 42 and heating circuits 60 of the heating system 12 are further discussed in reference to FIGS. 3-5. As further discussed herein, the controller 42 may be configured to activate each of the heating circuits 60 to independently heat each of the heating zones 20a-20c based on a status or condition of one or more operating systems and/or accessories of the vehicle 10, some of which are discussed herein. Accordingly, the disclosure may provide for a flexible solution that may be implemented to prioritize the heating of one or more of the zones 20 of the windows 14 of the vehicle based on the status or condition of the vehicle 10.

As previously discussed, the shape and position of each of the heating zones 20a-20c on the backlight 18 may be determined based on the anticipated height of the operator 22 of the vehicle 10. The specific proportions of each of the heating zones 20a-20c may vary based on the position of the operator's seat 28, the height of the operator 22, the location of the rearview mirror 26, and the distance and position of the backlight 18 relative to the operator 22 and the rearview mirror 26. The proportion of each of the heating zones 20a-20c may be calculated based on an expected range of heights of the operator 22 for vehicles having a variety of dimensions for the relative positon of the operator seat 28, the rearview mirror 26, and the location/height of the backlight 18. Accordingly, the proportions of each of the heating zones 20a-20c, and primarily the first heating zone 20a, may be easily calculated based on the vision cone or field of view 24 anticipated for the expected variations of heights of the operator 22 of the vehicle 10.

As previously discussed, the first heating zone 20a may correspond to a primary heating zone, which may be formed in a triangular or conical shape. For example, as demonstrated in FIGS. 1 and 2, the base 30 of the triangular shape of the first heating zone 20a may be curved between a first leg 32 and a second leg 34 of the triangular shape forming the first heating zone 20a. Additionally, the base 30 may extend horizontally from a lower portion of the first leg 32 to a lower portion of the second leg 34 or along a substantially horizontal line that may diverge from a horizontal path along a curvature 36 of the base 30. In this configuration, the triangular or conical shape of the first heating zone 20a may be configured to encompass the entirety of the vision cone for the expected heights of the operator 22 as demonstrated by the field of view 24.

As discussed herein, the controller 42 may correspond to a vehicle control module implemented as one or more processors in communication with a memory. The one or more processors discussed herein may be any suitable processing device or set of processing devices such as, but not limited to: a microprocessor, a microcontroller-based platform, a suitable integrated circuit, one or more field-programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid-state drives, etc.). In some examples, the memory includes multiple kinds of memory, particularly volatile memory and non-volatile memory.

The memory referred to in the disclosure may correspond to a computer-readable media on which one or more sets of instructions, such as the software for operating the methods of the present disclosure, can be embedded. The instructions may embody one or more of the methods or logic as described herein. Additionally, the terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein.

Figure 3:
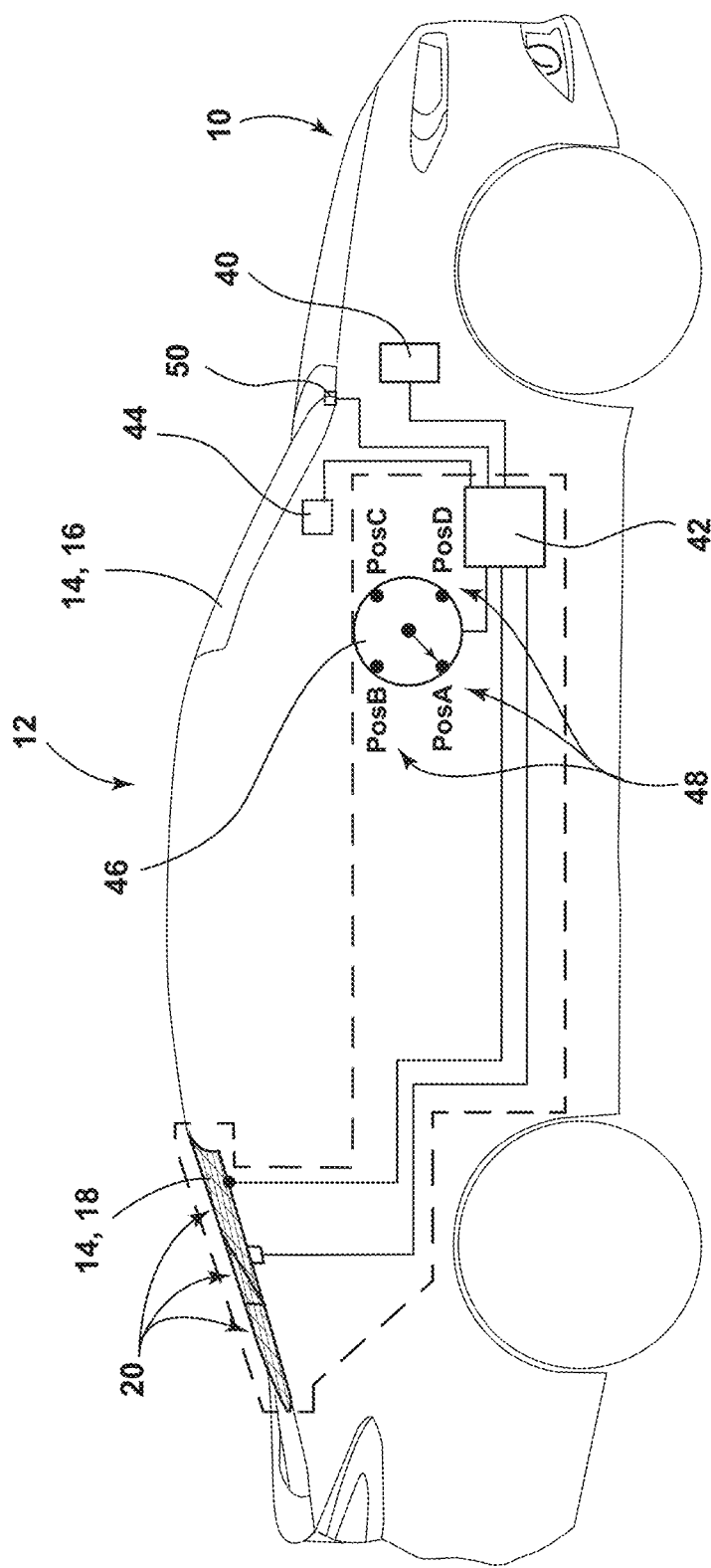
FIG. 3 is a profile schematic view of a multi-zone backlight heating system.

Referring now to FIG. 3, a profile view of the vehicle 10 is shown demonstrating a schematic diagram of the multi-zone heating system 12. The multi-zone heating system 12 may be configured to prioritize the activation of each of the heating circuits 60 and corresponding heating zones 20a-20c of the vehicle 10 based on a variety of control variables and/or control sensory inputs. In some implementations, the vehicle 10 may correspond to an electric or hybrid-electric vehicle that is configured to operate or supply power to a drive train via energy stored within an electrical storage unit 40 for a battery cell. In such implementations, the controller 42 may be configured to monitor an electrical charge of the electrical storage unit 40 and selectively activate or suppress the activation of one or more of the heating zones 20a-20c based on the electrical charge detected for the electrical storage unit 40.

For example, the controller 42 may be configured to suppress the activation of the third heating zone 20c in response to a charge level of the electrical storage unit 40 being less than a first threshold charge. Additionally, the controller 42 may be configured to suppress the activation of the second heating zone 20b and the third heating zone 20c in response to the electrical charge level of the electrical storage unit 40 being less than a second threshold charge. In such an example, the first threshold charge may be greater than the second threshold charge, such that the first threshold charge corresponds to a higher or greater level of potential energy stored in the electrical storage unit 40 than the second threshold charge. In this way, the controller 42 may limit the energy supplied to one or more of the heating zones 20 of the multi-zone heating system 12 in order to prioritize the energy usage of the system 12.

In some implementations, the controller 42 may further be in communication with a user interface 44 and/or selection switch 46, each of which may be configured to selectively activate one or more of the heating zones 20a-20c based on a user selection. For example, as demonstrated in FIG. 3, the selection switch 46 may comprise a plurality of positions 48, which may include a first position PosA, a second position PosB, a third position PosC, and a fourth position PosD. The first position PosA may correspond to a deactivated position that may be configured to instruct the controller 42 to deactivate or suppress an activation of the multi-zone heating system 12. The second position PosB may be configured to instruct the controller 42 to activate all (or withhold a suppression) of the heating zones 20a-20c. The third position PosC may be configured to instruct the controller 42 to activate the first heating zone 20a and the second heating zone 20b while suppressing the activation of the third heating zone 20c. Finally, the fourth position PosD may be configured to instruct the controller 42 to activate the first heating zone 20a while suppressing the second heating zone 20b and the third heating zone 20c.

As discussed herein, the user interface 44 or selection switch 46 may be configured to provide the operator 22 or a user of the vehicle 10 with a manual control configured to selectively activate one or more of the heating zones 20a-20c. The manual activation of the heating zones 20a-20c may further be arbitrated by the controller 42 to suppress the activation of one or more of the heating zones based on the electrical charge of the electrical storage unit 40. For example, if a user of the multi-zone heating system 12 manually controls the selection switch 46 to a second position PosB, the controller 42 may identify the requested activation to include the first heating zone 20a, the second heating zone 20b, and the third heating zone 20c. However, if the electrical charge of the electrical storage unit 40 is below the first threshold, as previously discussed, the controller 42 may suppress the activation of the third heating zone 20c in order to preserve the energy or charge of the electrical storage unit 40 for operation of the vehicle 10. Further details of the control methods and operation of the multi-zone heating system 12 are discussed in reference to the flow chart demonstrated FIG. 6.

Though discussed in reference to the selection switch 46, the user interface 44 may be implemented as a variety of input devices including programmable soft keys, touch screen interfaces that may be also configured to control a variety of systems or accessories of the vehicle 10. Accordingly, the user-interface may be in communication with the controller 42, which may correspond to a vehicle control module, via a control or communication bus. For example, in some implementations, the user interface 44 may comprise a human-machine interface (HMI) including a display, such as a center-stack mounted navigation or entertainment display of the vehicle 10. The user interface 44 may further include an input device, which may be implemented by configuring the vehicle display as a touchscreen. Other forms of input, including one or more joysticks, digital input pads, switches (e.g. the selection switch 46) or the like, can be used in place or in addition to touchscreen. Further, the system 12 may communicate via wireless communication with user interface 44 in the form of a handheld or portable devices, including one or more smartphones.

Still referring to FIG. 3, the controller 42 may further be in communication with one or more environmental sensors 50. As discussed herein, the environmental sensor(s) may comprise a temperature sensor, a humidity sensor, a conductively sensor, and/or a variety of sensors that may be configured to detect conditions related to defogging and/or frost on the windows 14 of the vehicle 10. In operation, the controller 42 may monitor the status of the environmental sensors 50 and automatically activate the multi-zone heating system 12 in order to remove frost or fog from the windows 14 and/or prevent frost and/or fog from building up on the windows 14.

For example, in some implementations, the controller 42 may monitor the status of a humidity sensor and a temperature sensor implemented as the environmental sensors. During operation or startup of the vehicle 10, a controller 42 may identify if moisture is detected by the humidity sensor and/or whether the temperature sensor registers a temperature below a freezing threshold. Accordingly, the controller 42 may monitor the environmental sensors 50 to determine if a frost condition exists based on the humidity level and/or temperature indicated and automatically activate the multi-zone heating system 12 to heat one or more of the windows 14 to remove the frost accumulated thereon. Following the automated activation of the system 12, the controller 42 may continue to arbitrate the activation of each of the heating zones 20a-20c based on the electrical charge of the electrical storage unit 40, as previously discussed.

Figure 4:
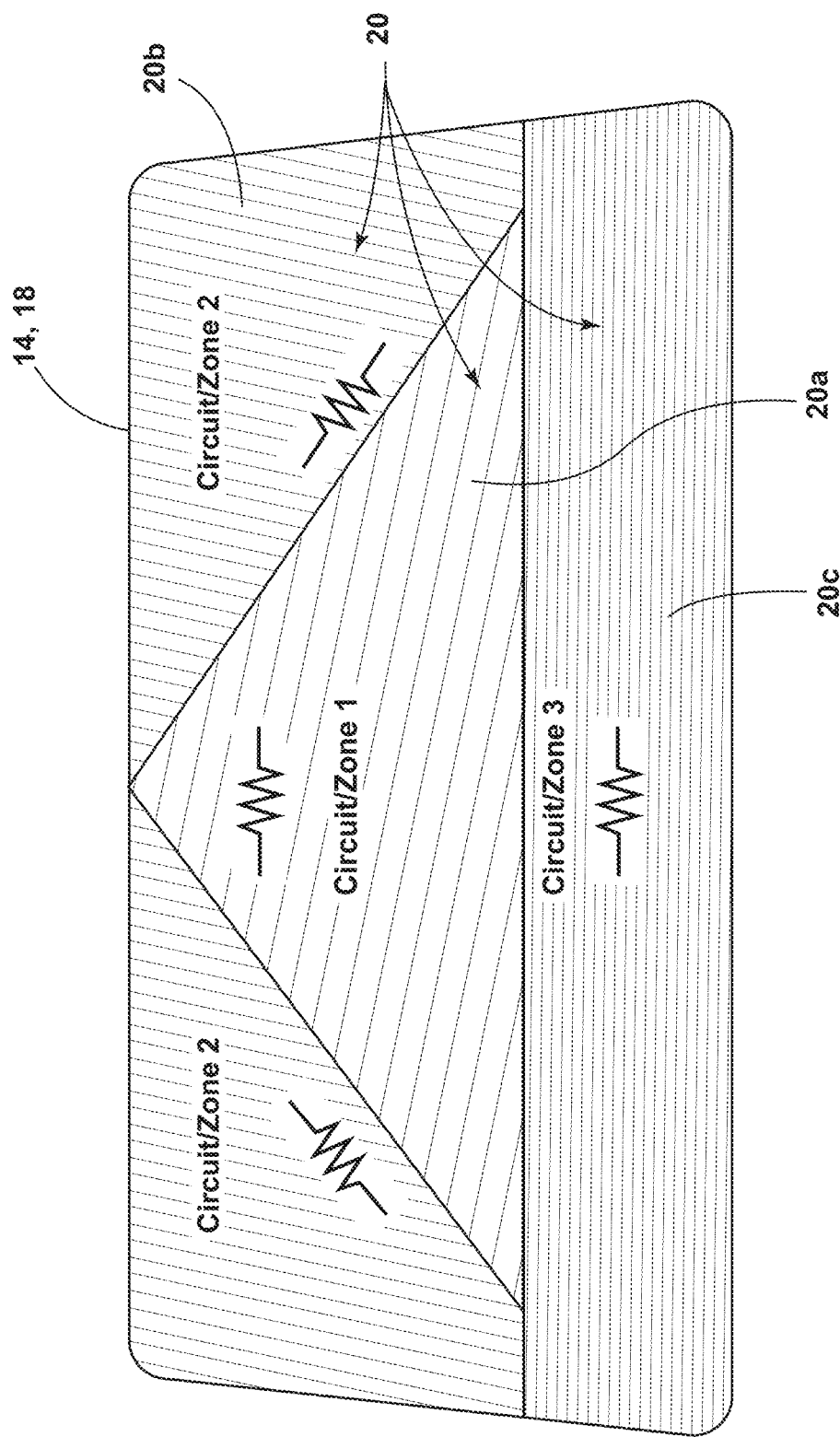
FIG. 4 is a diagram of a backlight or window demonstrating a plurality of heating circuits.
Figure 5:
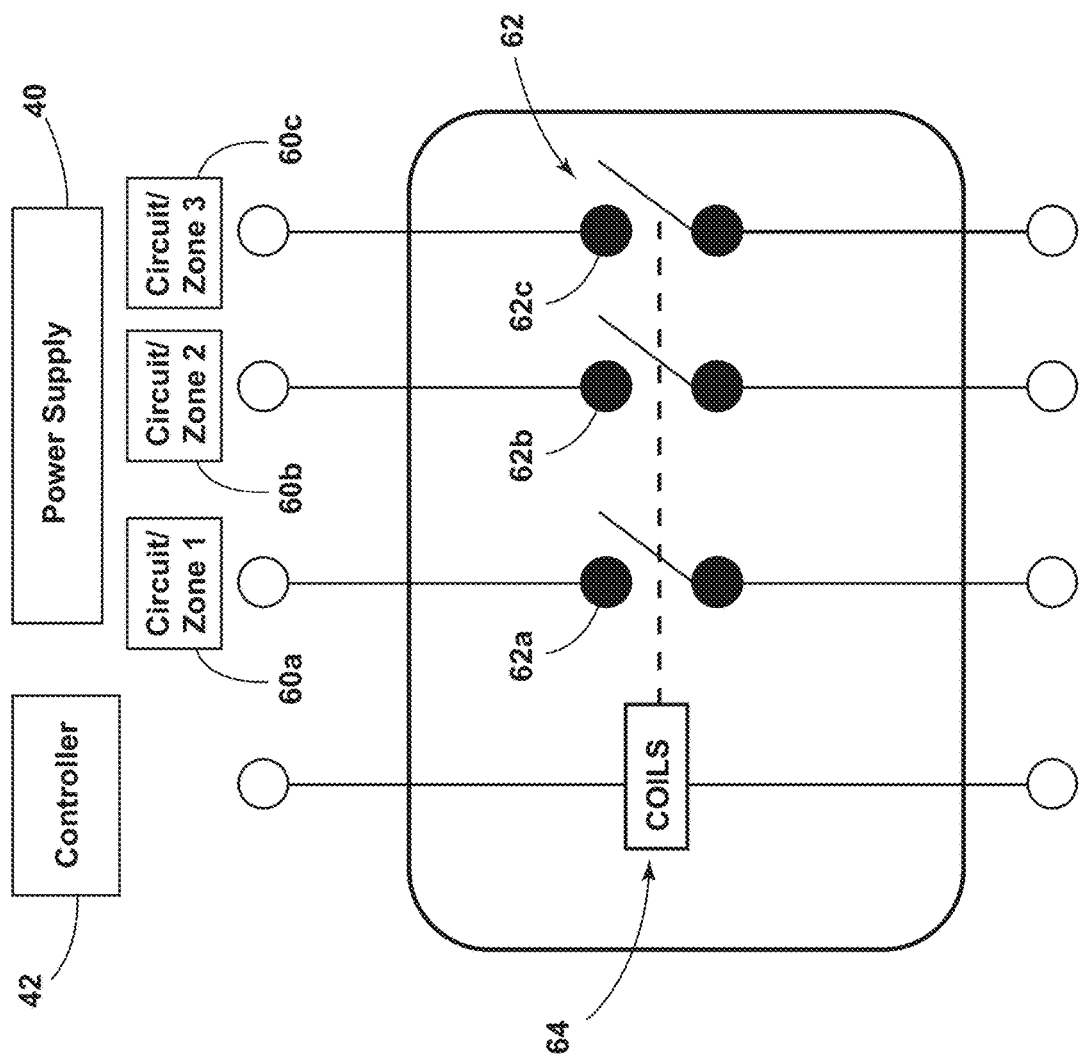
FIG. 5 is a schematic diagram of a heating control circuit of a multi-zone backlight heating system.

Referring now to FIGS. 4 and 5, a diagram of each of the heating zones 20a-20c and the corresponding heating circuits 60a-60c are shown, respectively. As previously discussed, the controller 42 may be configured to selectively activate or supply heat to each of the heating zones 20a-20c by activating the corresponding heating circuit 60a-60c. In various implementations, the heating circuits 60 may be activated by the controller 42 by communicating signals to one or more electronic or electromechanical switches configured to selectively deliver currents to the resistive elements disposed in the window 14 defining each of the heating zones 20a-20c. For example, the controller 42 may communicate electrical signals to one or more transistors, relays, or various switching devices to selectively activate each of the heating circuits 60 and conduct current from the electrical storage unit 40 to one or more corresponding heating zones 20a-20c.

As demonstrated in FIG. 5, each of the heating circuits 60 comprises a relay switch 62 that may be activated by the controller 42 via a signal communicated to a corresponding relay coil 64. For example, the controller 42 may selectively activate a first heating circuit 60a by communicating a control signal to a corresponding relay coil configured to activate a first relay switch 62a. Similarly, the controller 42 may selectively activate a second heating circuit 60b and a third heating circuit 60c by communicating control signals to the respective relay coils configured to activate a second relay switch 62b and a third relay switch 62c. Accordingly, the controller 42 may be configured to selectively activate or suppress the activation of each of the heating zones 20a-20c by controlling the current delivered to the heating zones 20a-20c via the heating circuits 60. In this configuration, the multi-zone heating system 12 may provide for prioritized activation of one or more of the heating zones 20a-20c based on a user preference identified via the selection switch 46 or a user interface, an automatic activation based on conditions detected by the environmental sensors 50, and/or a charge level of the electrical storage unit 40 of the vehicle 10.

Figure 6:
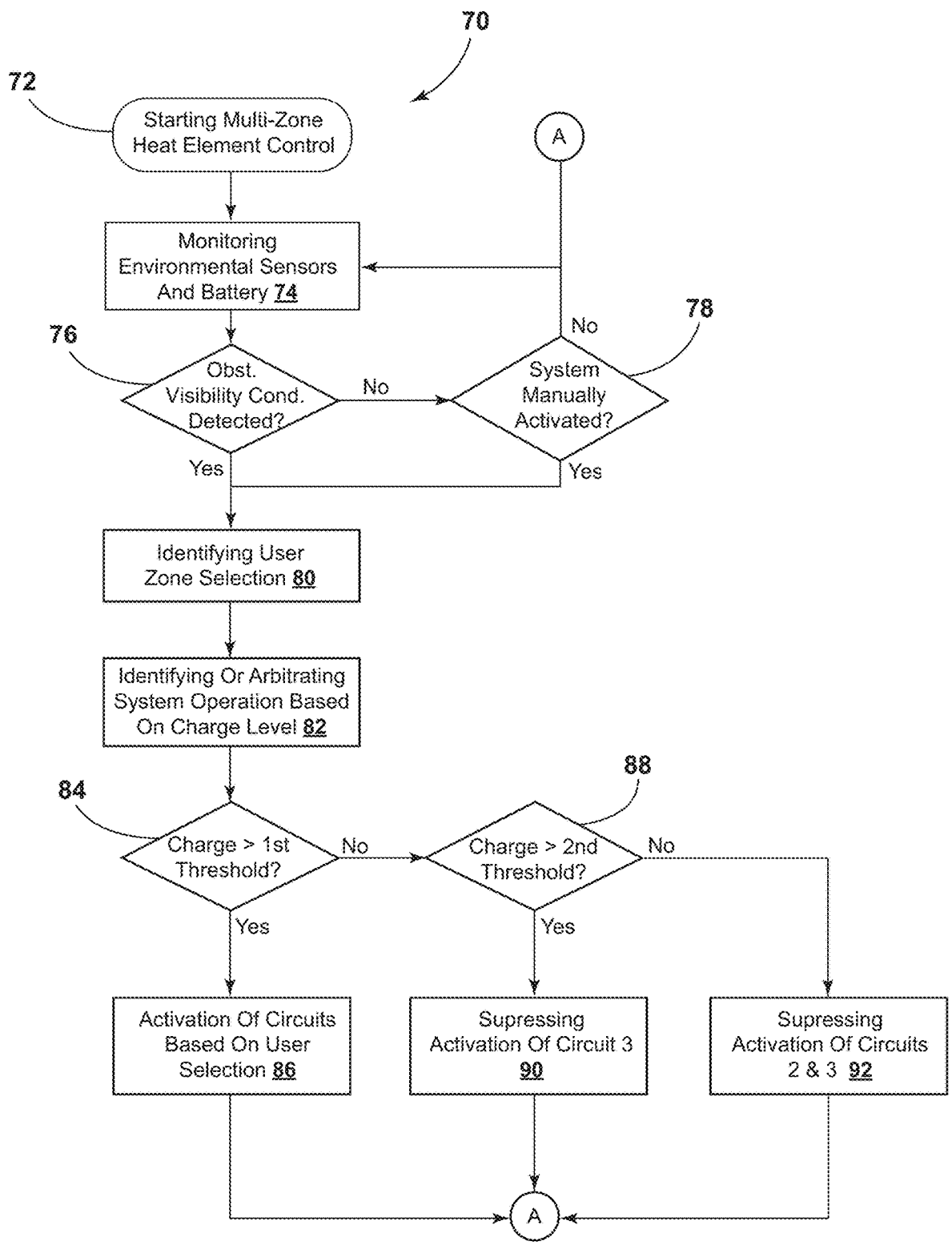
FIG. 6 is a flow chart demonstrating a method for controlling a multi-zone backlight heating system in accordance with the disclosure.

Referring now to FIG. 6, a flow chart is shown demonstrating a method 70 for controlling the multi-zone heating system 12. The method 70 may be controlled by the controller 42, which may be in communication with a variety of additional vehicle control systems as further discussed later in the detailed description. Method 70 may begin in response to an ignition or starting of the vehicle 10, as shown in step 72. Once activated, the controller 42 may monitor the environmental sensors 50 and the electrical charge level of the electrical storage unit 40 or batter cell (74). Based on the conditions identified via the environmental sensors 50, the controller 42 may identify if an obstructed visibility condition is detected (76). For example, the controller 42 may monitor the environmental sensors 50 to detect or determine obstructed visibility conditions that may correspond to ice buildup, frost or snow buildup, condensation, or fog conditions on one or more of the windows 14 (e.g., backlight 18) of the vehicle 10. If an obstructed visibility condition is not identified by the controller 42 in step 76, the controller 42 may detect whether the selection switch 46 indicates a manual activation of one or more of the heating zones 20a-20c (78). If a manual activation is not detected in step 78, the method 70 may return to step 74 to continue monitoring the environmental sensors 50 and the status of the electrical storage unit 40. If an activation of the multi-zone heating system 12 is requested or identified in either of steps 76 or 78, the method 70 may continue to step 80. For example, the system 12 may be configured to continue to step 80 in response to a manual activation and/or an automated activation in response to the identification of an obstructed visibility condition as discussed in reference to step 76.

In step 80, the method 70 may identify the positon 48 of the selection switch 46 or an input to the user interface 44 identifying a user selected heating zone 20a-20c. Once the user selected heating zone is identified, the method 70 may continue to identify or arbitrate the operation of the system 12 based on the electrical charge level of the electrical storage unit 40 (82). In step 84, if the charge level of the electrical storage unit 40 is identified to be greater than the first threshold charge, the controller 42 may continue to step 86 to activate each of the heating circuits 60 based on the user selection identified in step 80. If the charge level of the electrical storage unit 40 is less than the first threshold charge in step 84, the method 70 may continue to step 88.

In step 88, the controller 42 may identify whether the charge level of the electrical storage unit 40 is greater than a second threshold charge. The second threshold charge may be less than the first threshold charge and indicate that a charge level of the electrical storage unit 40 is diminished, such that activation of two or more of the heating circuits 60 may unnecessarily diminish the charge level and potentially limit an operating rage of the vehicle 10 Accordingly, if the charge level of the electrical storage unit 40 is determined to be greater than the second threshold charge, the method may continue to step 90 and suppress the activation of the third heating circuit 60c and corresponding third heating zone 20c. Such a suppression of the third heating zone 20c may be controlled by the method 70 to override a user zone selection identified in step 80. Finally, if the charge level of the electrical storage unit 40 is determined to be less than the second threshold charge, the method 70 may continue to step 92 and suppress the activation of the second heating circuit 60b and third heating circuit 60c. As demonstrated by reference A, this method may continue throughout operation of the vehicle 10 by returning to step 74.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is to be understood that variations and modifications can be made on the aforementioned structure without departing from the concepts of the present disclosure, and further it is to be understood that such concepts are intended to be covered by the following claims unless these claims by their language expressly state otherwise. It will also be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An apparatus for heating a window of a vehicle comprising:
   an electrical storage unit configured to store an electrical charge, wherein the electrical storage unit is configured to power a drivetrain of the vehicle;
   a plurality of heating circuits disposed on a window of the vehicle, wherein the plurality of heating circuits comprise a first circuit disposed over a first zone of the window and a second circuit disposed over a second zone of the window, wherein the first zone forms a triangular shape disposed over a central portion of the window comprising a base extending substantially parallel to a base of the window, and the second zone is disposed over a second portion of the window around a perimeter of the first zone; and
   a controller configured to:
   monitor the electrical charge of the electrical storage unit; and
   selectively activate one or more of the heating circuits based on the electrical charge.

2. The apparatus according to claim 1, wherein the window is a backlight of the vehicle and the first zone is aligned with a vision cone defining a field of view reflected from a rearview mirror of the vehicle.

3. The apparatus according to claim 2, wherein the vision cone is defined by a height range of operators of the vehicle and the first zone extends to a perimeter of the vision cone reflected through the backlight.

4. The apparatus according to claim 1, wherein the selective activation of the heating circuits comprises:
   in response to the electrical charge being greater than a first threshold charge, activating the first circuit and the second circuit.

5. The apparatus according to claim 4, wherein the selective activation of the heating circuits comprises:
   in response to the electrical charge being less than the first threshold charge, activating the first circuit and suppressing the activation of the second circuit.

6. The apparatus according to claim 5, wherein the heating circuits further comprise a third circuit, wherein the third circuit is disposed over a third portion disposed around the perimeter of the first zone.

7. The apparatus according to claim 6, wherein the first zone forms a triangular shape comprising a base, wherein the second portion is disposed below the base and the third portion is disposed above the base.

8. The apparatus according to claim 6, wherein the selective activation of the heating circuits comprises:
   in response to the electrical charge being greater than the first threshold charge, activating the first circuit, the second circuit, and the third circuit; and in response to the electrical charge being less than a second threshold charge, suppressing the activation of the second circuit and the third circuit.

9. The apparatus according to claim 1, further comprising a user interface, wherein the controller is configured to identify a state of the user interface and selectively suppress an activation of at least one of the heating circuits based on the state.

10. The apparatus according to claim 9, wherein the user interface comprises a movable switch comprising a plurality of positions identifying the state.

11. The apparatus according to claim 10, wherein the user interface comprises a selection menu accessible via a human-machine interface (HMI) comprising a display screen.

12. The apparatus according to claim 11, wherein the human-machine interface (HMI) is disposed in a center stack of a passenger compartment of the vehicle.

13. The apparatus according to claim 10, wherein in response to the state indicated by the user interface, the controller is configured to prioritize the suppression of the heating circuits based on the state over the electrical charge of the an electrical storage unit.

14. A method for controlling a multi-zone backlight heating module of a vehicle, the method comprising:
  supplying operating energy to one of more motors of the vehicle via an electrical storage unit of the vehicle;
  monitoring an electrical charge of the electrical storage unit;
  selectively supplying current from the electrical storage unit to a plurality of heating circuits forming the multi-zone backlight heating module, wherein selectively supplying the current comprises:
    in response to the electrical charge being greater than a first threshold charge, activating each of the plurality of heating circuits; and
    in response to the electrical charge being less than the first threshold charge, suppressing current to a first heating circuit of the plurality of heating circuits, wherein at least one unsuppressed heating circuit of the plurality of heating circuits is supplied current and selectively activated based on a priority of the heating zones to an operation of the vehicle, wherein the unsuppressed heating circuit substantially encompasses a cone-shape or triangular zone corresponding to a field of view reflected from a rearview mirror through a backlight of the vehicle.

15. An apparatus for heating a backlight of a vehicle comprising:
  an electrical storage unit configured to store an electrical charge wherein the electrical storage unit is configured to power a drivetrain of the vehicle;
  a plurality of heating circuits disposed on a window of the vehicle, wherein the heating circuits comprise:
    a first circuit configured to heat a central zone of the backlight, wherein the central zone forms a triangular shape comprising a base extending substantially horizontal along the backlight and a perimeter; and
    a second circuit configured to heat a secondary zone disposed outside the perimeter of the central zone; and
  a controller configured to:
    monitor the electrical charge of the electrical storage unit;
    selectively activate the first circuit and the second circuit in response to the electrical charge greater than a threshold charge; and
    suppress current to the second circuit in response to the electrical charge less than the threshold charge.

16. The apparatus according to claim 1, wherein the controller is further configured to:
  selectively activate or suppress the activation of one or more of the heating zones based on the electrical charge of the electrical storage unit and a priority of the heating zones to the operation of the vehicle.

* * * * *